United States Patent
Liashenko et al.

(10) Patent No.: US 11,404,057 B2
(45) Date of Patent: Aug. 2, 2022

(54) ADAPTIVE INTERACTIVE VOICE RESPONSE SYSTEM

(71) Applicant: Accenture Global Solutions Limited, Dublin (IE)

(72) Inventors: Artur Liashenko, London (GB); Augusto Gugliotta, London (GB); Laetitia Cailleteau, London (GB); Juris Stūrainis, Daugavpils (LV); Ankur Banerjee, London (GB)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 16/000,138

(22) Filed: Jun. 5, 2018

(65) Prior Publication Data
US 2019/0267000 A1    Aug. 29, 2019

Related U.S. Application Data

(60) Provisional application No. 62/634,373, filed on Feb. 23, 2018.

(51) Int. Cl.
*G10L 15/22* (2006.01)
*G10L 15/00* (2013.01)
(Continued)

(52) U.S. Cl.
CPC ............ *G10L 15/22* (2013.01); *G10L 13/00* (2013.01); *G10L 15/005* (2013.01); *G10L 15/18* (2013.01); *G10L 15/30* (2013.01); *H04M 3/42059* (2013.01); *H04M 3/493* (2013.01); *H04M 2201/39* (2013.01); *H04M 2201/40* (2013.01);
(Continued)

(58) Field of Classification Search
CPC ......... G10L 15/22; G10L 15/30; G10L 15/32; G10L 15/34; G10L 13/00; G10L 13/04; H04M 2201/39; H04M 2201/40
See application file for complete search history.

(56) References Cited

U.S. PATENT DOCUMENTS

| | | | |
|---|---|---|---|
| 6,230,138 B1 * | 5/2001 | Everhart | G10L 15/26 704/275 |
| 6,567,419 B1 * | 5/2003 | Yarlagadda | H04M 7/006 370/466 |

(Continued)

OTHER PUBLICATIONS

"About IBM Voice Gateway," IBM Knowledge Center, pp. 1-9, published online by IBM, Armonk, NY.

*Primary Examiner* — Paras D Shah
(74) *Attorney, Agent, or Firm* — Crowell & Moring LLP

(57) ABSTRACT

An interactive voice adapter for adaptive voice routing may establish a real-time communication session between a voice communication client and a text communication client and the voice adapter may receive the audio stream and the text information. The voice adapter may obtain adapted natural language text corresponding to the natural language audio by selectively accessing a speech-to-text service based on a selection criteria. The voice adapter may obtain adapted natural language audio corresponding to the natural language text by selectively accessing a text-to-speech service based on the selection criteria. The voice adapter may communicate the adapted natural language text to the text communication client and the adapted natural language audio to the voice communication client.

21 Claims, 6 Drawing Sheets

(51) Int. Cl.
*G10L 15/30* (2013.01)
*H04M 3/42* (2006.01)
*H04M 3/493* (2006.01)
*G10L 13/00* (2006.01)
*G10L 15/18* (2013.01)

(52) U.S. Cl.
CPC .... *H04M 2201/42* (2013.01); *H04M 2201/60* (2013.01); *H04M 2203/2061* (2013.01); *H04M 2242/12* (2013.01)

(56) References Cited

U.S. PATENT DOCUMENTS

| | | | | |
|---|---|---|---|---|
| 8,861,689 | B1* | 10/2014 | Typrin | H04M 19/04 379/88.22 |
| 2001/0056348 | A1* | 12/2001 | Hyde-Thomson | G10L 13/08 704/260 |
| 2003/0088421 | A1* | 5/2003 | Maes | G10L 15/30 704/270.1 |
| 2005/0041788 | A1* | 2/2005 | Jan | H04M 3/50 379/88.18 |
| 2006/0129406 | A1* | 6/2006 | Mandalia | G10L 15/30 704/270.1 |
| 2009/0003576 | A1* | 1/2009 | Singh | G06Q 10/107 379/202.01 |
| 2011/0307241 | A1* | 12/2011 | Waibel | G10L 15/265 704/2 |
| 2013/0272511 | A1* | 10/2013 | Bouzid | H04M 3/493 379/88.01 |
| 2014/0278435 | A1* | 9/2014 | Ganong, III | G10L 15/22 704/275 |
| 2017/0187876 | A1* | 6/2017 | Hayes | H04M 3/56 |
| 2017/0279959 | A1* | 9/2017 | Karimi-Cherkandi | H04Q 11/0428 |
| 2017/0293905 | A1* | 10/2017 | Washington | G06Q 50/12 |
| 2018/0096687 | A1* | 4/2018 | Cook | G10L 15/26 |
| 2019/0007806 | A1* | 1/2019 | Chu | H04W 4/16 |
| 2019/0147851 | A1* | 5/2019 | Kizuki | G10L 15/005 704/251 |
| 2019/0348044 | A1* | 11/2019 | Chun | G06F 21/32 |

* cited by examiner

ADAPTIVE INTERACTIVE VOICE RESPONSE SYSTEM

CROSS REFERENCE TO RELATED APPLICATIONS

This application claims the benefit of U.S. Provisional Application No. 62/634,373 filed Feb. 23, 2018, the entirety of which is hereby incorporated by reference.

TECHNICAL FIELD

This disclosure relates to audio processing and, in particular, to audio processing with artificial intelligence and natural language processing.

BACKGROUND

Telephony services, such as interactive voice recognition (IVR) services, may be designed for human-machine interactions using dual-tone multi-frequency (DTMF) signaling or voice recognition. Telephony services may be constrained by a limited number of supported audio formats and/or supported communications protocols. These and other design constraints may prevent telephony services, particularly legacy services, from integrating with other systems. Redevelopment to support other systems may be costly, inefficient, prone to errors, and risky as technology standards change over time.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
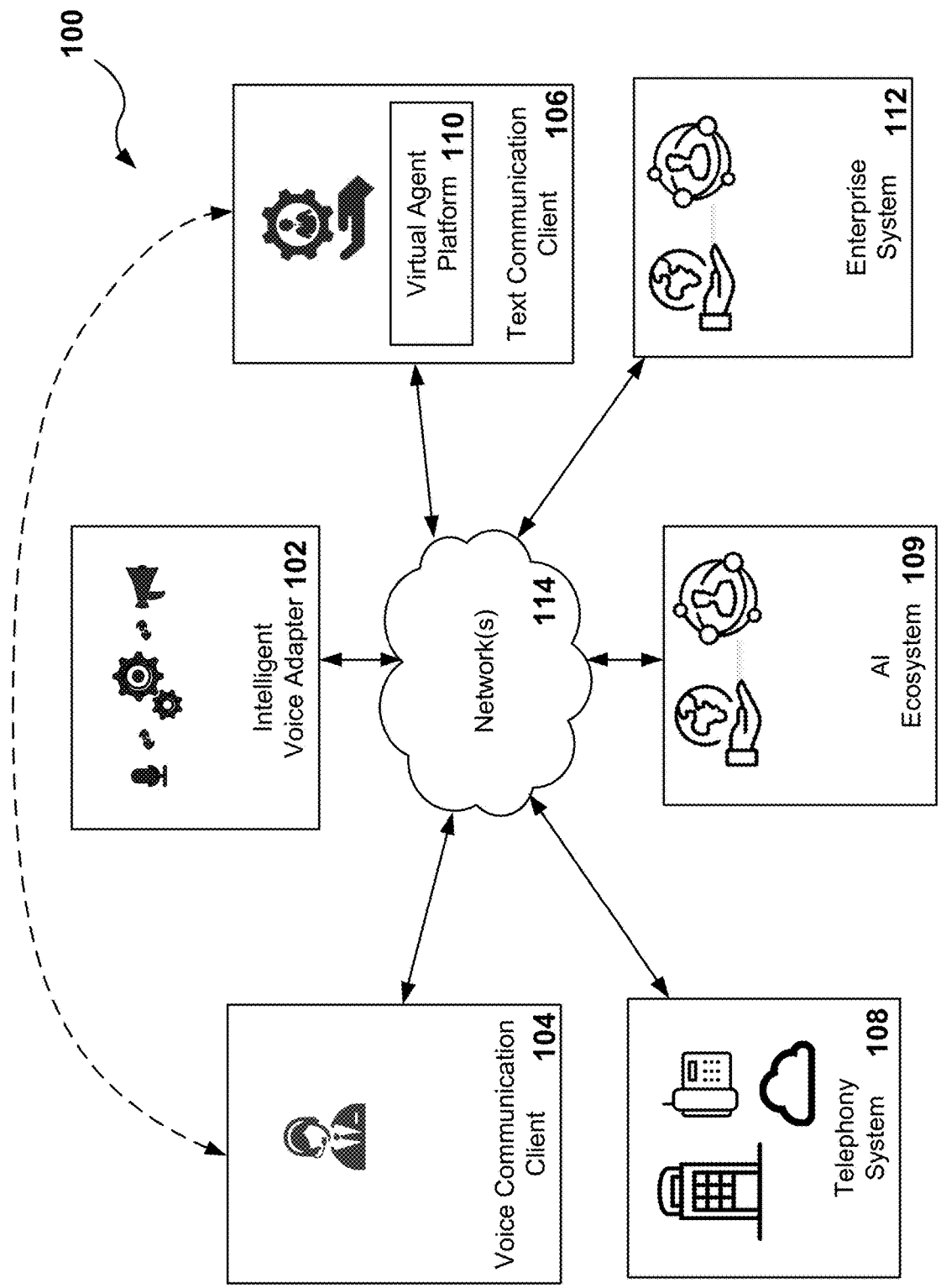
FIG. 1 illustrates a first example of a system for adaptive interactive voice processing.

By way of introductory example, a system and method for adaptive interactive voice routing is described herein. The system may include an interactive voice adapter. The interactive voice adapter may establish a real-time communication session between a voice communication client and a text communication client. The voice communication client may communicate an audio stream including natural language audio. The text communication client may communicate text information including natural language text. The voice adapter may receive the audio stream and the text information.

The voice adapter may obtain adapted natural language text corresponding to the natural language audio. To obtain the adapted natural language text, the voice adapter may select, based on a selection parameter, a speech-to-text service configuration from a plurality of speech-to-text configurations. The selected speech-to-text service configuration may be associated with a speech-to-text service. The voice adapter may communicate with the speech-to-text service to convert the natural language audio to the adapted natural language text based on the selected speech-to-text service configuration.

The voice adapter may obtain adapted natural language audio corresponding to the natural language text. To obtain the adapted natural language audio, the voice adapter may select, based on the selection parameter, a text-to-speech service configuration from a plurality of text-to-speech service configurations based on a second selection criteria. The selected text-to-speech service configuration may be associated with a text-to-speech service. The voice adapter may communicate with the text-to-speech service to convert the natural language text to the adapted natural language audio based on the text-to-speech service configuration.

The voice adapter may communicate the adapted natural language text to the text communication client and the adapted natural language audio to the voice communication client.

In some examples, the voice adapter may receive the selection parameter from the voice communication client. The selection parameter may be based on at least one of the natural language audio or dual-tone multi-frequency (DTMF) signaling information. Alternatively or in addition, the voice adapter may receive the selection parameter from the text communication client.

In some examples, the voice adapter may communicate a display interface configured to receive the selection parameter. The display interface may include respective identifiers of the text-to-speech service configurations and/or respective identifiers of the speech-to-text service configurations. The voice adapter may receive the selection parameter based on interaction with the display interface. The selection parameter may include at least one of an identifier of the selected speech-to-text service configuration or an identifier of the selected text-to-speech service configuration.

In some examples, the voice adapter may dynamically identify a language corresponding to the text communication client. The voice adapter may configure the speech-to-text service to provide the adapted natural language text in the language or select a different speech-to-text service configured to provide the adapted natural language text in the language. To dynamically identify the language corresponding to the text communication client, voice adapter may obtain session information related to the audio stream. The session information may include a caller identifier, a telephone number, or a geographic location, and/or a language identifier. The voice adapter may determine the language corresponding to the voice communication client 104 based on the session information.

In some examples, to select the speech-to-text service configuration, the voice adapter may detect the selection parameter associated with one or more of the speech-to-text services. The voice adapter may apply the selection parameter to selection criteria associated with the speech-to-text service configuration. The voice adapter may select the speech-to-text service configuration in response to application of the selection parameter to the selection criteria.

In some examples, the selection parameter may include a usage parameter, a performance parameter, a geographic location parameter, a participant identifier, and/or an option selection. The voice communications client may include an interactive voice response system. The text communication client may include a virtual agent.

In some examples, the natural language audio may be based on a first audio encoding and the speech-to-text service may be configured for a second audio encoding. To communicate with the speech-to-text service to convert the natural language audio to the adapted natural language, the voice adapter may convert the natural language audio from the first audio encoding to the second audio encoding. The voice adapter may communicate the converted natural language audio to the speech-to-text service.

One example of a technical advancement achieved by the systems and methods described below may be that IVR, telephony systems, and/or other sources of human voice or text information may be dynamically adapted for communications with virtual agents, artificially intelligent natural language processors, and/or other enterprise systems. Instead of redeveloping legacy systems, natural language information communicated to and/or from a virtual agent may be adapted by selectively leveraging text-to-speech and speech-to-text services. Natural language processing, text-to-speech service and/or the speech-to-text services may be selected in real-time based on information received from a telephony system or a virtual agent. The systems and methods described below may maximize cohesion and minimize coupling between audio processing, command processing, and natural language interpretation.

Alternatively or in addition, another example of a technical effect achieved by the systems and method described below may be that processing time and/or availability of virtual agents may be improved as particular natural language, text-to-speech and speech-to-text services may be dynamically selected based on their performance and/or availability. Another example of the technical effect achieved by the system and methods described below may be audio information from a user may be converted to text in real-time without the need to wait for interrupts in speech patterns and/or dial tones. Another technical effect is that the systems and methods described may operate as a universal technology agnostic adapter to allow any selected one of multiple IVR systems to integrate with any selected one of multiple AI speech-to-text conversion services and any selected one of multiple AI virtual agent services. Additional benefits, efficiencies, and improvements over existing market solutions are made evident in the systems and methods described below.

FIG. 1 illustrates a first example of a system 100 for adaptive interactive voice processing. The system 100 may include an intelligent voice adapter 102. The voice adapter 102 may facilitate the exchange of voice and text communication between one or more voice communication client 104 and one or more text communication client 106. Alternatively or in addition, the voice adapter 102 may adjust voice and/or text data exchanged between a telephony system 108, such as an interactive voice response systems, cloud-based telephony services, or any other sources of human or machine communication.

The voice adapter 102 may enable a real-time communication session between the voice communication client 104 and the text communication client 106. The real-time communication session may include a live conversation between intelligent or artificially intelligent users of the voice communication client 104 and/or the text communication client 106. The voice adapter 102 may access one or more services or features provided by an AI ecosystem 109. For example, the AI ecosystem 109 may include text-to-speech services and/or speech-to-text services. The voice adapter 102 may selectively and and/or configure the services available in the AI ecosystem 109.

The voice adapter 102 may conform the real-time communication session to performance standards, user preferences, service level agreements, and other constraints. In an example, the voice adapter 102 may receive a selection parameter prior to runtime. The voice adapter 102 may select a service included in the AI ecosystem 109 based on the selection parameter. Alternatively or in addition, the voice adapter may dynamically receive or obtain a selection parameter based on received input and/or monitored attributes. In an example, the voice adapter may monitor the performance of one or more natural language processing services provided by the AI ecosystem 109 and switch between services to keep up with the natural langue language processing demands of the real-time communications session. Refer to the discussion in reference to FIG. 2 for additional examples and discussion related to the voice adapter 102 and the selection of services available in the AI ecosystem 109.

The voice communication client 104 may include one or more devices configured to transmit and/or receive voice audio. The voice communication client 104 may include a human-machine interface configured to communicate natural language audio information and/or an audio stream. For example, the voice communication client 104 may include a mobile phone, a personal computer, a headset, and/or any other type of communications device configured to communicate audio information.

The text communication client 106 may include any client capable of communicating text-based natural language information. The text communication client 106 may send and receive text communications in various formats including, for example, JSON, HTML, and/or any other suitable format for transferring data or performing remote procedure invocation. In some examples, the text communication client 106 may include a human-machine interface. Alternatively or in addition, the text communication client 106 may include and/or communicate with a virtual agent platform 110.

The telephony system 108 may include any system configured to manage, host, and/or facilitate telecommunications between clients. For example, the telephony system 108 may include an interactive voice response system, a cloud-based telephony service, a voice-over-IP (VOIP) infrastructure, a private branch exchange (PBX), and/or any other technology to facilitate and manage phone calls between one or more clients. In some examples, the telephony system 108 may include the voice communication client 104. Alternatively or in addition, the voice communication client 104 may communicate with the telephony system 108 to access other end-points, such as the voice adapter 102. In other examples, the voice communication client 104 may communicate directly with the voice adapter 102.

The telephony system 108 may receive, route, and/or transfer call sessions between clients. For example, the voice communication client 104 may request a voice communication session with the voice adapter 102, or some other client. The telephony system 108 may receive the request and route the request to the voice adapter 102. In some examples, the telephony system 108 may transfer the session to the voice adapter 102. In other examples, an audio stream from the voice client may stream to intelligent voice adapter 102 via the telephony system 108. The telephony system 108, the voice adapter 102, and/or the voice communication client 104 may utilize voice-based protocol, such as a Session Initiated Protocol (SIP), Real-Time-Protocol (RTP), Media Resource Control Protocol (MRCP), and/or any other suitable protocol for controlling communication sessions. The audio data exchanged between the voice communication client 104 the voice adapter 102 and/or the telephony system 108 may include an audio stream encoded in any suitable format including, for example, G.711.

In general, the AI ecosystem 109 may include one or more hosted services configured to provide machine learning, natural language processing, natural langue understanding, and/or any other artificial intelligent processing. In some examples, the AI ecosystem may include services provided by one or more vendors. Alternatively or in addition, each of the services available in the AI Ecosystem may be hosted at various remote physical locations. The intelligent voice adapter may configure, access, and/or manage services included in the AI ecosystem 109. In some examples, the voice adapter may access multiple implementations or configurations of a service provided by a same vendor and/or associated with a particular account.

As previously discussed, the text communication client 106 may include the virtual agent platform 110. The virtual agent platform 110 may include a framework to provide one or more virtual agents. A virtual agent may include a service or logic configured to receive natural language input and to respond the natural language input using artificial intelligence. A virtual agent may provide machine-generated natural language responses and prompts to natural language input.

In some examples, the virtual agent framework 110 may access features of an AI ecosystem 109. For example, virtual agent platform 110 may utilize the AI ecosystem 109 to perform natural language processing and/or natural language understanding. For example, the virtual agent platform 110 may identify intents and entities, and/or any other relevant attribute, of natural language information. Alternatively or in addition, the virtual agent platform 110 may communicate with an enterprise system 112 to perform operations based on the human-machine conversations. The enterprise system 112 may include any combination of hardware and software and/or infrastructure for processing service-related operations in an enterprise. The virtual agent platform 110 may cause the enterprise system 112 to perform particular action and/or retrieve data based on a detected intent of natural language information. In one example, the virtual agent framework 110 may receive a natural language request to active cellular service. The virtual agent framework 110 may access the AI ecosystem 109 to interpret the intent(s) of the natural language information associated with the request. In response to the recognized intent of "cellular service activation", the virtual agent platform 110 may communicate with a cellular service provider and/or other billing systems to facilitate the activation.

The virtual agent platform 110 may respond to natural language text input in a manner that is consistent with human conversation patterns and linguistics. By adapting the audio information to the text inputs expected by the virtual agent platform 110, the virtual agent platform 110 may process adapted text information from the voice adapter 102 in real-time. Accordingly, a voice user may interact with the virtual agent without the need to provide speech interrupts and/or dial tones monitored in traditional interactive voice systems.

The system 100 may be implemented in many ways. The system 100 may include at least the intelligent voice adapter 102. In other examples, the system 100 may include the voice communication client 104 and/or the text communication client 106. The intelligent voice adapter 102 may be integrated or separate from other components of the system. For example, the intelligent voice adapter 102 may be integrated with the voice communication client 104, the telephony system 108 and/or the text communication client 106.

The voice adapter 102, the voice communication client 104, text communication client, the telephony system 108, the AI ecosystem 109, and/or the enterprise system 112 may communicate over a network 114. The network 114 may include a communication system to facilitate the exchange of analog or digital information. For example, the network 114 may include a computer network where information is exchanged between physical or virtual runtime environments. For example, the network 114 may include a, WAN, (wide area network), LAN (local area network), WLAN wireless local area network, system-area network (SAN), virtual private network (VPN), or any other type of suitable computer network. Alternatively or in addition, the network 114 may include a telephone network, such as a PSTN (public switched telephone network) or a private branch exchange (PBX). In some examples, certain portions of the network may be walled or separated from other portions of the network 114. Alternatively or in addition, the network 114 may include multiple different types of networks. In other examples, the voice adapter 102 may communicate with components using additional or alternative communications methods, including, for example, messaging services, pipes, in-memory communications, or any other type of relevant communications method over any suitable communications medium.

Figure 2:
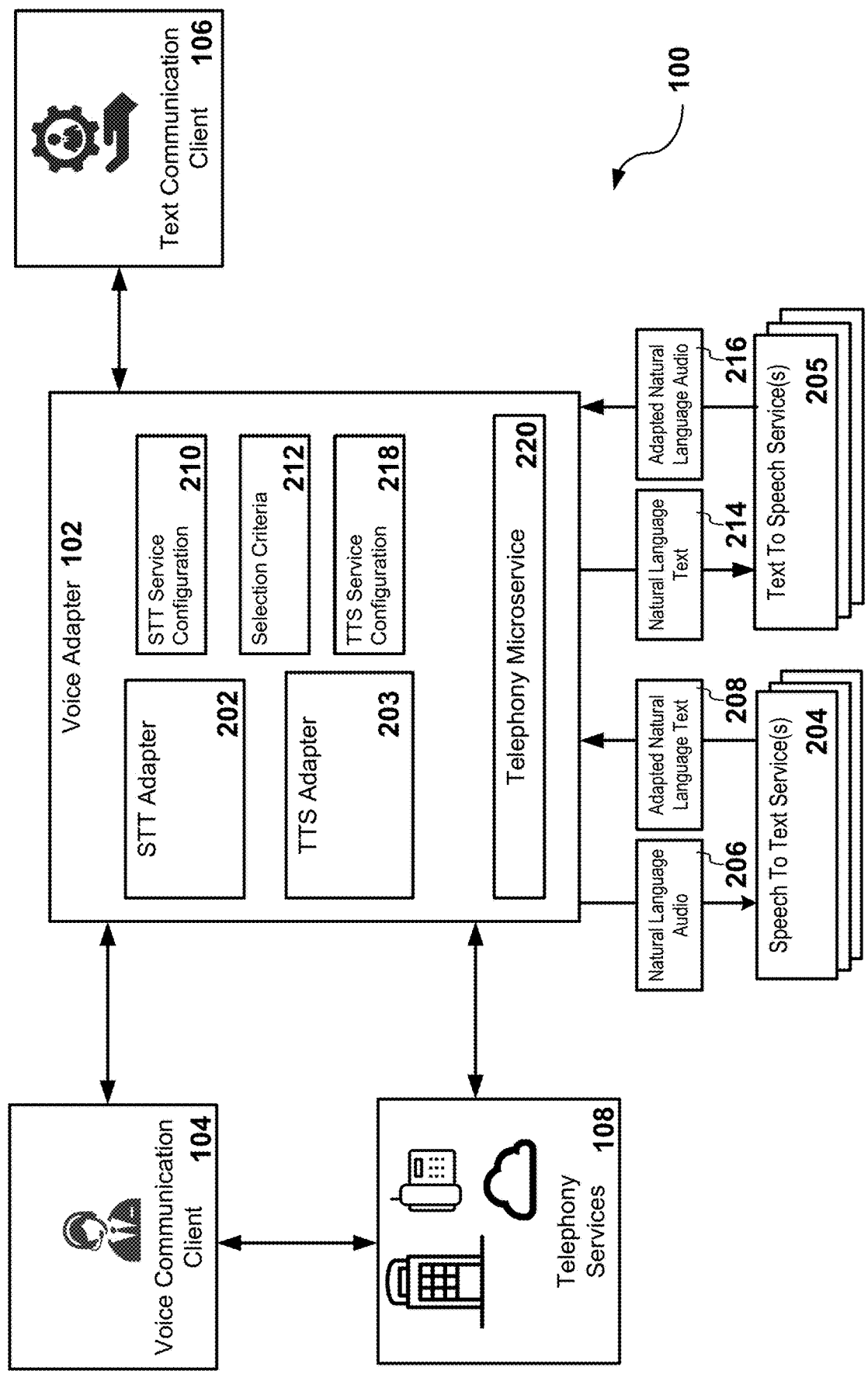
FIG. 2 illustrates an example of the intelligent voice adapter.

FIG. 2 illustrates an example of the intelligent voice adapter 102. The voice adapter 102 may include service adapters 202-203. The service adapters 202-203 may include a speech-to-text (STT) adapter 202 and a text-to-speech (TTS) adapter 203. The service adapters 202, 203 may communicate with natural language processing services 204, 205. The natural language processing services 204, 205 may include a speech-to-text (STT) service 204 and a text-to-speech (TTS) service 205. In some examples, the STT service 204 may include multiple STT services. Alternatively or in addition, the TTS service 205 may include multiple TTS services.

Speech-to-Text (STT) Adapter

The STT adapter 202 may communicate with the STT service 204 to convert natural language audio 206 into adapted natural language text 208. For example, the voice adapter 102 may receive the natural language audio 206 from the voice communication client 104 and/or the telephony system 108. The STT adapter 202 may communicate the natural language audio 206 to the STT service 204. The STT service 204 may receive the natural language audio 206 and convert the natural language audio 206 into adapted natural language text 208 that is representative of the natural language audio 206. In some examples, the adapted natural language text 208 may be wrapped in a JSON object, or some other notation language. The STT service 208 may apply artificial intelligence to convert the natural language audio 206 to the adapted natural language text 208.

The STT adapter 202 may utilize a STT service configuration 210 to communicate with the STT service 204. A STT service configuration 210 may include any information used to configure, communicate with, and/or identify the STT service 204. For example, a STT service configuration 210 may include one or more configuration values that are communicated to the STT service 204 to define how the STT service 204 should perform the conversion between audio and text. Alternatively or in addition, the STT service configuration 210 may include an identifier of a particular STT service 204, such as a web address, IP address, and/or any other identification information relevant to uniquely identifying and/or accessing an implementation of the STT service 204. In some examples, the STT service configuration 210 may include logic that may be called to identify and/or access the STT service 204. The logic may be combined with other parameters to configure or control the STT service 204 and/or invoke a particular feature of the STT service 204.

In some examples, the STT adapter 202 may select a particular STT service configuration and/or a particular STT service based on a selection criteria 212. For example, multiple STT service configurations 210 and/or STT services may be accessible. The selection criteria 212 may include one or more rules for selecting the STT service configuration 210 and/or STT service 204. In some examples, the selection criteria 212 may identify which STT service configuration 210 to use for speech-to-text conversion based on language attributes, service availability to meet client-specific service level agreements, selected service metrics, and/or other monitored or predefined parameters. The selection criteria 212 may be associated with a particular STT service configuration. Based on an evaluation of the selection criteria 212, the associated STT service configuration 210 may be selected. Because the STT service configuration 210 may be associated with or identify the STT service 204, the STT adapter 202 may apply the STT service configuration 210 to identify and communicate with the STT service 204 implementation.

In some examples, the STT 210 adapter may adjust the natural language audio 206 received by the voice adapter 102 to fit the constraints of the STT service 204. Depending on the vendor, the STT service 204 may support a limited set of protocols and/or audio encodings. In some examples, the STT adapter 202 may receive an audio stream encoded in particular format (e.g. G.711) over a specific communications protocol (e.g. UDP or WebRTC). The STT adapter 202 may convert the audio stream from a first protocol, e.g. G.711, to a second protocol, e.g. PCM. In some examples, the audio sent to the STT service 204 may include an audio file, such as a .wav file, or .mp3 file, or any other type of audio file. Alternatively or in addition, the audio sent to the speech-to-text service may include a modified audio stream.

Text-To-Speech (TTS) Adapter

The TTS adapter 203 may communicate with the TTS service 205 to convert natural language text 214 into adapted natural language audio 216. For example, the voice adapter 102 may receive the natural language text 214 from the text communication client 106, or some other source. The TTS adapter 203 may communicate the natural language text 214 to the TTS service 205. The TTS service 205 may receive the natural language text 214 and convert the natural language text 214 into adapted natural language audio 216 that is representative of the natural language text 214. The adapted natural language audio 216 may include audio information in any relevant file format or streaming format.

The TTS adapter 203 may utilize a TTS service configuration 218 to communicate with the TTS service 205. A TTS service configuration 218 may include any information used to configure, communicate with, and/or identify the TTS service 205. For example, a TTS service configuration 218 may include one or more configuration values that are communicated to the TTS service 205 to define how the TTS service 205 should perform the conversion between audio and text. Alternatively or in addition, the TTS service configuration 218 may include an identifier of a particular TTS service, such as a web address, IP address, vendor identifier, and/or any other identification information relevant to uniquely identifying and/or accessing an implementation of a TTS service. In some examples, the TTS service configuration 218 may include logic that may be called to identify and/or access the TTS service 205. The logic may be combined with other parameters to configure or control the TTS service 205 and/or invoke a particular feature of the TTS service 205.

In some examples, the TTS adapter 203 may select a particular TTS service configuration and/or a particular TTS service based on the selection criteria 212. For example, multiple TTS service configurations and/or TTS services may be accessible. The selection criteria 212 may include one or more rules for selecting the TTS service configuration 218 and/or TTS service 205. In some examples, the selection criteria 212 may identify which TTS service configuration 218 to use for text-to-speech conversion based on language attributes, service availability to meet client-specific service level agreements, selected service metrics, and/or other monitored or predefined parameters. The selection criteria 212 may be associated with a particular TTS service configuration. Based on an evaluation of the selection criteria 212, the associated TTS service configuration 218 may be selected. Because the TTS service configuration 218 may be associated with or identify the TTS service 205, the TTS adapter 203 may apply the TTS service configuration 218 to identify and communicate with the TTS service 205 implementation.

Selection Parameter and Selection Criteria

The voice adapter 102 may receive and/or generate a selection parameter, or multiple selection parameters, that are used to select and/or configure the natural language services 204, 205. For example, at least one of the service adapters 202 may analyze the selection parameter to select one or more of the service configurations 210, 218 and/or the natural language services 204, 205. In some examples, the selection parameters may be received from various sources external to the voice adapter 102.

In general, the selection parameter may include a detected or previously configured parameter. For example, the voice communication client 104, the text communication client 106, the telephony system 108, the STT service 204, the TTS service 205, and/or any other participant of the real-time communication session may communicate the selection parameter, or information used to generate the selection parameter, to the voice adapter 102. Alternatively or in addition, the voice adapter 102 may access a database or memory that is configured to store the selection parameter.

In some examples, the voice adapter 102 may generate a display interface configured to receive the selection parameter. The voice adapter 102 may communicate the display interface to a manager client device. The manager client device may receive the display interface and interact with the display interface. The display interface may include respective identifiers of the TTS service configurations and respective identifiers of the STT service configurations. The voice adapter 102 may receive the selection parameter based on interaction with the display interface. The selection parameter may be received before or during runtime of the voice adapter 102.

In other examples, the voice adapter 102 may dynamically obtain and respond to the selection parameter. For example, the voice adapter 102 may receive session information related to an audio stream or text information received by the voice adapter 102. For example, the session information may include session initiated protocol (SIP)

information and/or real-time protocol (RTP) information. Alternatively or in addition, the session information may include information such as a user identifier, a session duration, a telephone number, or a geographic location, a language identifier and/or other relevant information. The voice adapter 102 may use the session information to identify or generate the selection parameter.

The following discussion provides non-limiting examples of the selection parameter. In an example, the selection parameter may include a participant identifier of a participant in a telephone call, VOIP session, any other example of telecommunications session. The participant identifier may include a source telephone number or a destination telephone number. Alternatively or in addition, the participant identifier may include a user identifier, such as a user identifier of a user signed into a VOIP application, chat application, or some other type of telecommunications application. The voice adapter 102 may apply the participant identifier to obtain a specific service configuration, such as the STT service configuration 210 or the TTS service configuration 218. For example, the voice adapter 102 may apply the participant identifier to the selection criteria 212 to select the TTS service configuration 218 and/or the STT service configuration 210.

In another example, the parameter may include a geographic location parameter. The geographic location parameter may include a geographic point or a geographic area corresponding to the voice communication client 104, the text communication client 106, and/or any participant of the real-time communication session. Alternatively or in addition, the geographic location parameter may be generated based on other parameters received by the voice adapter 102. In one example, the voice adapter 102 may receive a telephone number that is associated with a particular geographic location. The voice adapter 102 may apply the geographic location to select a particular service configuration and/or a particular natural language processing service based on a geographic location parameter. For example, the geographic area may be associated with a language, service availability, service pricing, or other information used to select or configure one or more of the natural language services 204, 205.

In another example, the selection parameter may include a language parameter. For example, the language parameter may specify a particular language used by, or associated with, the voice communication client 104, the text communications client 106, and/or another participant of the real-time communication session. The voice adapter 102 may use the language parameter to configure and/or select one or more natural language services 204, 205. For example, the STT adapter 202 may use the language parameter to select an STT service configuration 210 that uses a particular STT service 204 configured to provide the adapted natural language text 208 in a particular language. Alternatively or in addition, the TTS adapter 203 may use the language parameter to select a TTS service configuration 218 that uses a TTS service configured to provide the adapted natural language audio 216 in a particular language.

In another example, the selection parameter may include an option selection. The option selection may include selection information provided by one or more participants to the real-time communication session, such as the voice communication client 104 and/or the text communication client 106. The option selection may include, for example, an interactive voice menu selection. In another example, the option selection may include information provided by the text communication client 106, such as a language selection. The option selection may affect any aspect of the adapted natural language audio 216 and/or the adapted natural language text 208. For example, the option selection may affect the language, dialect, pitch, speed, or another attribute that affects the way the adapted natural language audio 208 sounds or the adapted natural language text 208 appears.

In some examples, the parameter may include a performance parameter. The performance parameter may be indicative of the performance of a particular TTS service or STT service. For example, the performance parameter may include, an availability indicator, a latency metric, a quality metric, or any other information which may indicate the availability, speed, and/or quality of output provided by one or more TTS service or one or more STT service. The voice adapter 102 may use the performance parameter to select and/or configure at least one of the natural language services 204. For example, the STT adapter 202 may determine, based on the performance parameter, that the STT service 204 is not performing according service level agreements or other criteria. The STT adapter 204 may select a different STT service configuration and/or a different STT service in response.

In an additional example, the parameter may include a usage parameter. The usage parameter may include a parameter related to the usage of the STT service 204 and/or the TTS service 205. For example, the usage parameter may include number of uses, an amount of time an account has been active, overages, charges, or any other information related to the usage, or cost of usage, of the STT service 204 and/or the TTS service 205. In some examples, the voice adapter 102 may switch between one or more natural language services based on the usage parameter. For example, the STT adapter 202 may switch from a first STT service to a second STT service in response to the usage parameter exceeding a threshold value or otherwise fall outside of predefined bounds.

The selection criteria 212 may include a rule and/or logic used to select a natural language processing service configuration and/or a natural language processing service. For example, the selection criteria 212 may include a rule used to select the STT service configuration 210 from a plurality of STT service configurations. Alternatively or in addition, the selection criteria 212 may include a rule used to select the TTS service configuration 218 from a plurality of TTS service configurations. In some examples, the selection criteria may be combined with the selection parameter. For example, the STT adapter 202 may apply one or more parameters to the selection criteria 212 to identify, configure, and/or access the STT service 204. Alternatively or in addition, the TTS adapter 203 may apply one or more parameters to the selection criteria 212 to identify, configure, and/or access the TTS service 205.

Telephony Microservice

The voice adapter may include a telephony microservice 220. The telephony microservice 220 may coordinate communication between the telephony system 108 (e.g. an IVR service), the voice communication client 104, and the text communication client 106. The telephony microservice 220 may communicate with the text communication client 106 using a communications protocol (e.g. TCP) by passing text wrapped in JSON objects, or any other format suitable for the consumer of natural language input. Alternatively or in addition, the telephony microservice 220 may communicate with the telephony system 108 and/or the voice communication client 104 using a session protocol (e.g. SIP) to receive call details (e.g. caller's number), enabling authentication and personalized service. Alternatively or in addition, the telephony microservice 220 may communicate with the telephony system 108 over the session protocol to pass instructions, such as initiate, hang up or transfer the call. For example, a call involving the voice communication client 104 may be transferred from the telephony system 108 to the telephony microservice 220. In some examples, the telephony microservice 220 may handle or take over session description protocol (SDP) communications, including connection port, audio codec, IP address, and/or other related information.

The telephony microservice 220 may selectively utilize one or more speech-to-text adapter and/or one or more text-to-speech adapter. For example, the telephony microservice 220 may direct an audio stream to a selected one or more of the speech-to-text and/or text-to-speech adapters. Alternatively or in addition, the telephony microservice 220 may ensure that the same virtual agent is accessible to a customer over telephony, IVR, and/or other channels, include web-based voice and text virtual agent interfaces. The selection of speech-to-text adapters or text-to-speech adapters may occur during deployment time and/or runtime.

Figure 3:
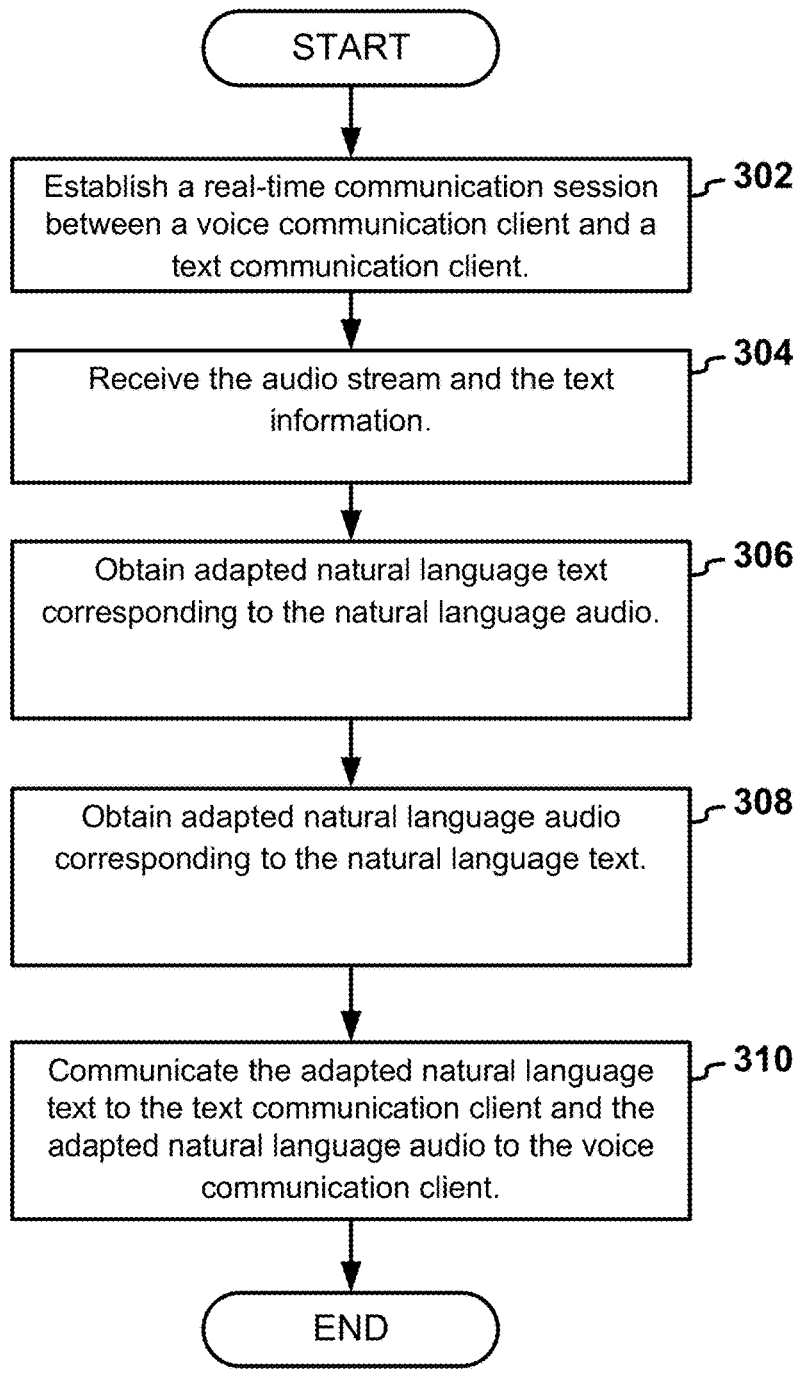
FIG. 3 illustrates a flow diagram of an example of logic for a system.

FIG. 3 illustrates a flow diagram for a first example of logic for the system 100. The voice adapter 102 may establish the real-time communication session between the voice communication client 104 and the text communication client 106. (302). The voice communication client 104 and/or the telephony system 108 may communicate an audio stream including natural language audio. The text communication client 106 may communicate text information comprising natural language text.

The voice adapter may receive the audio stream and the text information. (304). For example, the voice adapter may receive the audio stream from the voice communication client 104 and the text information from the text communication client 106. Alternatively or in addition, the audio stream may be received from the telephony system 108.

The STT adapter 202 may obtain the adapted natural language text 208 corresponding to the natural language audio 206 (306). For example, the adapted natural language text 208 may include a textual representation of the voice information included in the natural language audio 206. The STT adapter 202 may communicate with the STT service 204. The STT service 204 may be configured to convert the natural language audio 206 to the adapted natural language text 208.

The TTS adapter 203 may obtain adapted natural language audio 216 corresponding to the natural language text 214 (308). For example, the adapted natural language audio 216 may include an audio representation of the text information included in the natural language text 214. The TTS adapter 203 may communicate with the TTS service 205. The TTS service 205 may be configured to convert the natural language audio 206 to the adapted natural language text 208.

The voice adapter 102 may communicate the adapted natural language text 208 to the text communication client 106 and the adapted natural language audio 216 to the voice communication client 104 (310). The voice communication client 104 and the text communication client 106 may exchange the natural language information using the voice adapter 102 in real time. The adapted natural language audio 216 may be generated based on the natural language text 214 originated by the text communication client 106. Alternatively or in addition, the adapted natural language text 208 may be generated based on the natural language audio 206 originated by the voice communication client 104.

Figure 4:
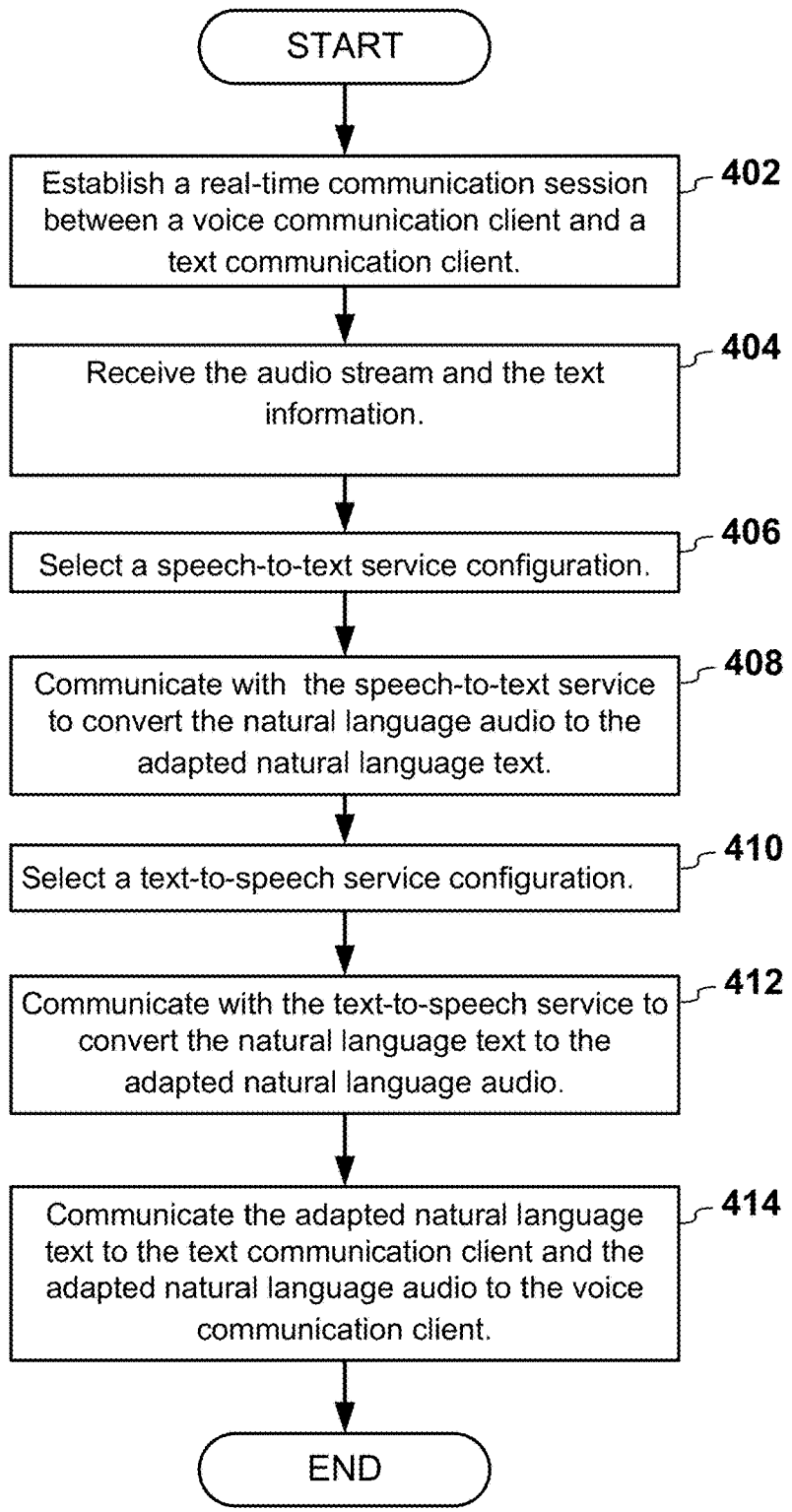
FIG. 4 illustrates a flow diagram of an example of logic for a system.

FIG. 4 illustrates a flow diagram for a section example of logic for the system 100. As previously discussed in reference to FIG. 3, the voice adapter 102 may establish a real-time communication session between the voice communication client 104 and the text communication client 106 (402). The voice adapter 102 may receive an audio stream and text information (404).

To obtain the adapted natural language text 208, the STT adapter 202 may perform additional or alternative operations. For example, the STT adapter 202 may select the STT service configuration 210 (406). For example, the STT adapter 202 may select the STT service 204 configuration from a plurality of STT services configurations. The STT service configuration 210 may identify and/or be associated with the STT service 204. Accordingly, the voice adapter may select a particular STT service based on the STT service configuration 210.

The STT adapter 202 may communicate with the STT service 204 to convert the natural language audio 206 to the adapted natural language text 208 (408). For example, the STT adapter 202 may communicate with the STT service 204 based on the STT service configuration 210, as previously discussed in reference to FIG. 2. The STT service configuration 210 may identify parameters, rules, logic, or other information used to identify and/or access the STT service 204.

To obtain the adapted natural language audio 216, the TTS adapter 203 may perform additional or alternative operations. For example, the voice adapter 102 may select a TTS service configuration 218 (410). The TTS adapter 203 may select the TTS service configuration 218 from a plurality of TTS service configurations. The TTS service configuration 218 may identify and/or be associated with the TTS service 205. Accordingly, the voice adapter 102 may select a particular TTS service TTS service based on the TTS service configuration 218.

The TTS adapter 203 may communicate with the TTS service 205 to convert the natural language text 214 to the adapted natural language audio 216 (412). For example, the TTS adapter 203 may communicate with the TTS service 205 based on the TTS service configuration 218, as previously discussed in reference to FIG. 2. The TTS service configuration 218 may identify parameters, rules, logic, or other information used to identify and/or access the TTS service 205.

The voice adapter 102 may communicate the adapted natural language text 208 to the text communication client 106 and the adapted natural language audio 216 to the voice communication client 104 (414). The voice communication client 104 and the text communication client 106 may exchange the natural language information using the voice adapter 102 in real time. The adapted natural language audio 216 may be generated based on the natural language text 214 originated by the text communication client 106. Alternatively or in addition, the adapted natural language text 208 may be generated based on the natural language audio 206 originated by the voice communication client 104.

The operations included in FIG. 3 and FIG. 4 may include additional, different, or fewer operations than illustrated. The steps may be executed in a different order than illustrated in FIG. 3 and FIG. 4.

Figure 5:
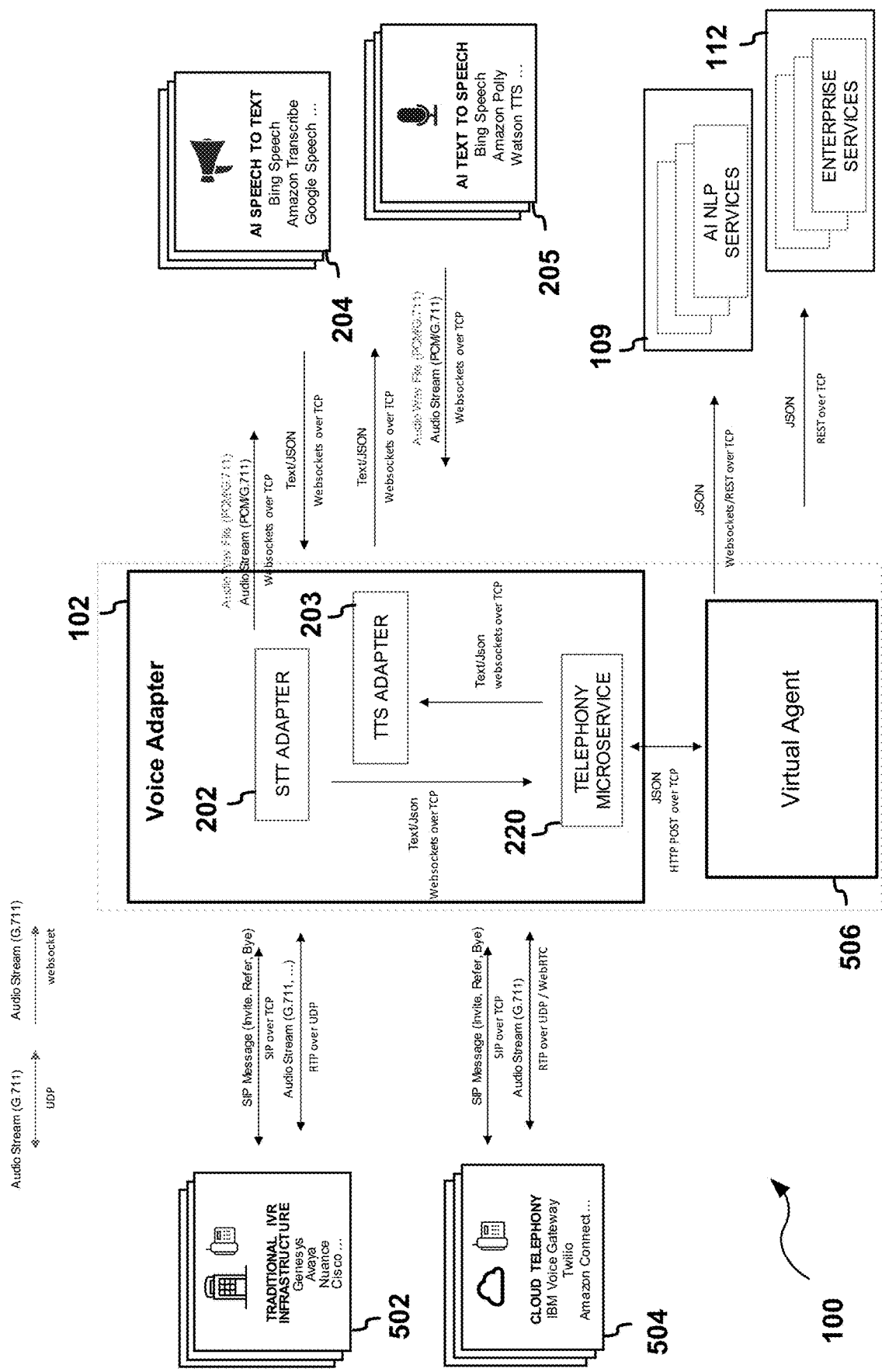
FIG. 5 illustrates a second example of a system for adaptive interactive voice processing.

FIG. 5 illustrates a second example of the system 100 for adaptive interactive voice processing. In the example illustrated in FIG. 5, the voice adapter 102 may communicate with one or more interactive voice response (IVR) infrastructure 502, one or more cloud telephony service 504, and/or one or more virtual agent 506.

The IVR infrastructure 502 may provide interactive voice response service to callers. For example, the IVR infrastructure may establish, manage, transfer, and/or route telecommunications sessions based on user. Alternatively or in addition, the IVR infrastructure may perform predefined operations in response user interaction (e.g. check balance, playback business hours, etc). The user interaction can include voice input and/or dual-tone multi-frequency signaling input. The cloud telephony service 504 may include a cloud-hosted service that provides access to IP-based telecommunications. For example, the cloud telephone services may provide establish and manage voice over IP (VOIP) sessions for registered subscribers.

The IVR infrastructure 502 and/or the cloud telephony service 504 may communicate session information and audio streams to the voice adapter 102. In some examples, such as the example illustrated in FIG. 5, the session information may follow a Session Initiated Protocol (SIP). The audio stream may follow a real-time-protocol (RTP) and include audio information formatted in a suitable format, such as G.711.

The virtual agent 506 may include a service or logic configured to receive natural language input and to respond the natural language input using artificial intelligence. The virtual agent 506 may provide machine-generated natural language responses and prompts to natural language input. The virtual agent 506 may respond to natural language inputs in a manner that is consistent with human language patterns and linguistics.

The virtual agent 506 may receive natural language information from the voice adapter 102. For example, the voice adapter 102, or subcomponents therein, may communicate the natural language information to the virtual agent 506 using JSON objects and a REST protocol. The virtual agent 506 may communicate with the AI ecosystems 109 to determine the intents and entities of the received natural information. Based on the intents, entities, and/or other natural language interpretation information, the virtual agent 506 may determine specific actions to perform in response to the natural language information. The virtual agent 506 may communicate with the enterprise system 112 to carry out the specific actions. For example, the virtual agent may communicate and/or receive JSON information using a REST-based API.

The system 100 may be implemented in many ways. In some examples, the telephony microservice 220, the STT adapter 202, and/or the TTS adapter 203 may be included on the same server. In other examples, the telephony microservice 220 may reside on a separate server from the TTS adapter 203 and/or the STT adapter 202. The telephony microservice 220, the TTS adapter 203, and/or the STT adapter 202 may be implemented with an event-driven, non-blocking I/O model, such as Node JS. Alternatively or in addition, the telephony microservice 220, the TTS adapter 203, and/or the STT adapter 202 may run in a container service, such as Docker.

The system 100 may be implemented with additional, different, or fewer components. Each component may include additional, different, or fewer components.

Figure 6:
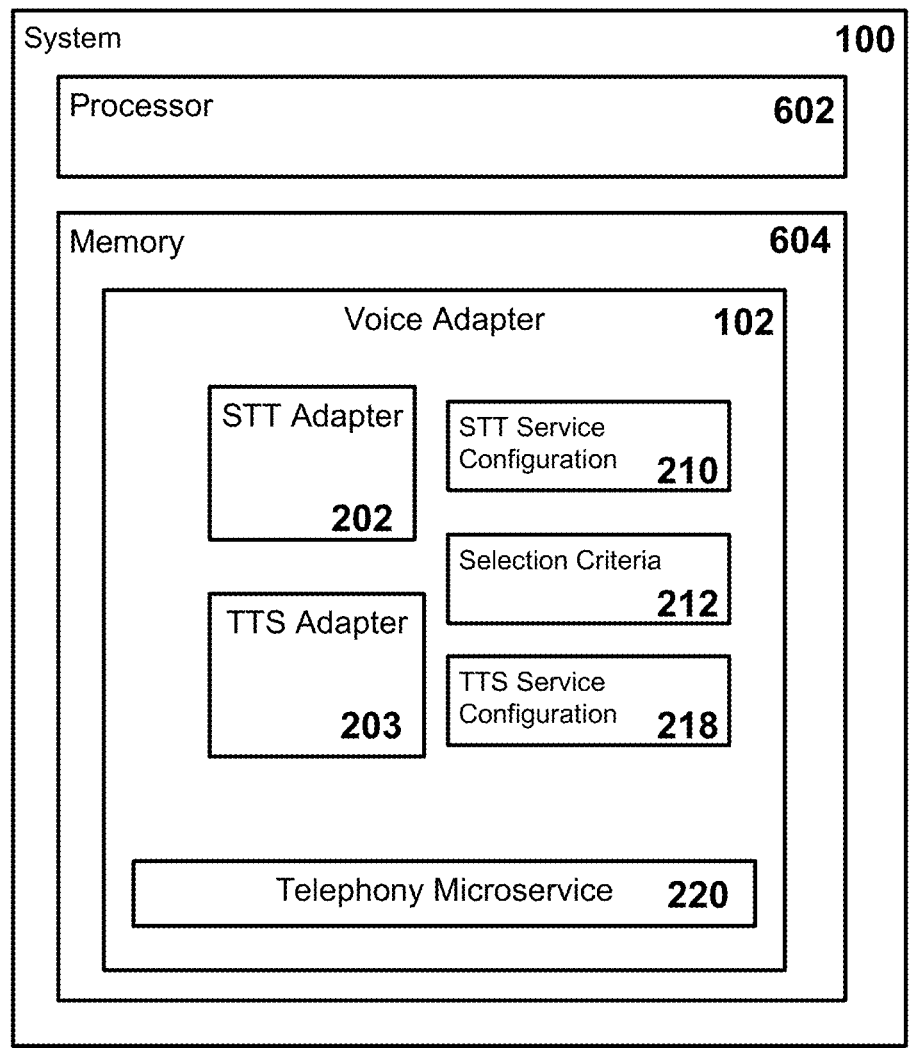
FIG. 6 illustrates an example of a system that includes a memory and a processor.

FIG. 6 illustrates an example of the system 100 that includes a processor 602 and a memory 604. The processor 602 may be in communication with the memory 604. In one example, the processor 602 may also be in communication with additional elements, such as a network interface (not shown). Examples of the processor 602 may include a general processor, a central processing unit, a microcontroller, a server, an application specific integrated circuit (ASIC), a digital signal processor, a field programmable gate array (FPGA), and/or a digital circuit, analog circuit, or some combination thereof. The processor 602 may reside in a system hosted on a local server in an enterprise, or third-party intermediary host, or in a cloud environment.

The processor 602 may be one or more devices operable to execute logic. The logic may include computer executable instructions or computer code stored in the memory 604 or in other memory that when executed by the processor 602, cause the processor 602 to perform the features implemented by the logic of the STT adapter 202, the TTS adapter 203, the telephony microservice 220, the voice adapter 102, and/or the system 100. The computer code may include instructions executable with the processor 602.

The memory 604 may be any device for storing and retrieving data or any combination thereof. The memory 604 may include non-volatile and/or volatile memory, such as a random access memory (RAM), a read-only memory (ROM), an erasable programmable read-only memory (EPROM), or flash memory. Alternatively or in addition, the memory 604 may include an optical, magnetic (hard-drive) or any other form of data storage device.

The memory 604 may include at least one virtual agent platform, the intelligent voice adapter. In addition, the memory 604 may include any other component previously discussed, such as STT adapter 202, the TTS adapter 203, the telephony microservice 220, the voice adapter 102, and/or the system 100, and/or other components of the system 100 described herein.

The system 100 may be implemented in many different ways. For example each component of the system 100 may include a circuit or circuitry. Each circuit or circuitry may be hardware or a combination of hardware and software. The circuitry may include STT adapter 202, the TTS adapter 203, the telephony microservice 220, the voice adapter 102, and/or the system 100, and/or other components and sub-components of the system 100 described herein. For example, each circuit or circuitry may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each circuitry may include memory hardware, such as a portion of the memory 604, for example, that comprises instructions executable with the processor 602 or other processor to implement one or more of the features of the circuitry. When any one of the circuitry includes the portion of the memory 604 that comprises instructions executable with the processor 602, the circuitry may or may not include the processor 602. In some examples, each circuitry may just be the portion of the memory 604 or other physical memory that comprises instructions executable with the processor 602 or other processor to implement the features of the corresponding circuitry without the circuitry including any other hardware. Because each circuitry includes at least some hardware even when the included hardware comprises software, each circuitry may be interchangeably referred to as a hardware circuitry.

Some features are shown stored in a computer readable storage medium (for example, as logic implemented as computer executable instructions or as data structures in memory). All or part of the system 100 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, floppy disks, and CD-ROMs. Moreover, the various modules, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A system for adaptive interactive voice routing, the system comprising:
a processor, the processor configured to:
establish a real-time communication session for a bi-directional live conversation between a voice communication client and a text communication client, the voice communication client configured to communicate, via a telephony system or directly from the voice communication client, an audio stream comprising natural language audio as a first side of the bi-directional live conversation, the text communication client configured to communicate text information comprising natural language text as a second side of the bi-directional live conversation;
receive a selection parameter from the voice communication client, wherein the selection parameter is based on receipt of dual-tone multi-frequency (DTMF) signaling information;
obtain adapted natural language text corresponding to the natural language audio, wherein to obtain the adapted natural language text, the processor is configured to:
select, based on the selection parameter, a speech-to-text service configuration from a plurality of speech-to-text service configurations, the selected speech-to-text service configuration associated with a speech-to-text service, and convert, by communication with the speech-to-text service, the natural language audio to the adapted natural language text based on the selected speech-to-text service configuration;

obtain adapted natural language audio corresponding to the natural language text, wherein to obtain the adapted natural language audio, the processor is configured to:

select, based on the selection parameter, a text-to-speech service configuration from a plurality of text-to-speech service configurations based on a selection criteria, the selected text-to-speech service configuration associated with a text-to-speech service, and convert, by communication with the text-to-speech service, the natural language text to the adapted natural language audio based on the text-to-speech service configuration;

coordinate communication between the telephony system, the voice communication client and the text communication client, with a predetermined communication protocol, during the bi-directional live conversation between the voice communication client and the text communication client;

communicate instructions to manage the conversation and the telephone system; and communicate the adapted natural language text to the text communication client and communicate the adapted natural language audio to the voice communication client.

2. The system of claim 1, wherein the processor is further configured to:
receive the selection parameter from the text communication client.

3. The system of claim 1, wherein the processor is further configured to:
communicate a display interface configured to receive the selection parameter, the display interface including respective identifiers of the text-to-speech service configurations and respective identifiers of the speech-to-text service configurations; and
receive the selection parameter based on interaction with the display interface, the selection parameter comprising at least one of an identifier of the selected speech-to-text service configuration or an identifier of the selected text-to-speech service configuration.

4. The system of claim 1, wherein the processor is further configured to:
dynamically identify a language corresponding to the text communication client; and
configure the speech-to-text service to provide the adapted natural language text corresponding to the natural language audio in the identified language or select a different speech-to-text service configured to provide the adapted natural language text in the identified language.

5. The system of claim 4, wherein to dynamically identify the language corresponding to the text communication client, the processor is further configured to:
obtain, from the telephony system or the voice communication client, session information related to the audio stream, the session information comprising at least one of a caller identifier, a telephone number, or a geographic location, or a language identifier; and
determine the language corresponding to the voice communication client based on the session information.

6. The system of claim 1, wherein to select the speech-to-text service configuration, the processor is further configured to:
detect the selection parameter associated with one or more of the speech-to-text services;
apply the selection parameter to selection criteria associated with the speech-to-text service configuration; and
select the speech-to-text service configuration in response to application of the selection parameter to the selection criteria.

7. The system of claim 6, wherein the selection parameter comprises at least one of a usage parameter, a performance parameter, a geographic location parameter, a participant identifier, or an option selection.

8. The system of claim 1, wherein the natural language audio is based on a first audio encoding and the speech-to-text service is configured for a second audio encoding, wherein to convert the natural language audio to the adapted natural language, the processor is further configured to:
convert the natural language audio from the first audio encoding to the second audio encoding; and
communicate the converted natural language audio to the speech-to-text service.

9. The system of claim 1, wherein the processor is further configured to:
communicate with the voice communication client and the telephony system using a session protocol to receive data comprising details of an identity of the voice communication client.

10. The system of claim 1, wherein the processor is further configured to:
control operation of the telephony system to transfer the real-time communication session from the telephone system to a telephony microservice executable by the processor via the telephony microservice instead of and not via the telephony system.

11. A computer-implemented method for adaptive interactive voice routing, the method comprising:
establishing a real-time communication session for a live bi-directional conversation between a voice communication client and a text communication client, the voice communication client configured to communicate via a telephony system or directly from the voice communication client, an audio stream comprising natural language audio as one side of the live bi-directional conversation, the text communication client configured to communicate text information comprising natural language text as an other side of the live bi-directional conversation;
receiving a selection parameter from the voice communication client, wherein the selection parameter is based on receipt of dual-tone multi-frequency (DTMF) signaling information initiated by the voice communication client;
obtaining adapted natural language text corresponding to the natural language audio, wherein to obtain the adapted natural language text, a processor is configured to:
select, based on the selection parameter, a speech-to-text service configuration from a plurality of speech-to-text configurations, the selected speech-to-text service configuration associated with a speech-to-text service, and
convert, by communication with the speech-to-text service, the natural language audio to the adapted natural language text based on the selected speech-to-text service configuration;

obtaining adapted natural language audio corresponding to the natural language text, wherein to obtain the adapted natural language audio, the processor is configured to:
   select, based on the selection parameter, a text-to-speech service configuration from a plurality of text-to-speech service configurations based on a selection criteria, the selected text-to-speech service configuration associated with a text-to-speech service, and
   convert, by communication with the text-to-speech service, the natural language text to the adapted natural language audio based on the text-to-speech service configuration;
coordinating, during the live bi-direction conversation, the communication between the telephony system, the voice communication client and the text communication client using a predetermined communication protocol comprising:
communicating, to the telephony system, instructions for the live bi-directional conversation; and
communicating the adapted natural language text to the text communication client and the adapted natural language audio to the voice communication.

12. The computer-implemented method of claim 11, further comprising:
receiving the selection parameter from the text communication client.

13. The computer-implemented method of claim 11, further comprising:
communicating a display interface configured to receive the selection parameter, the display interface including respective identifiers of the text-to-speech service configurations and respective identifiers of the speech-to-text service configurations; and
receiving the selection parameter based on interaction with the display interface, the selection parameter comprising at least one of an identifier of the selected speech-to-text service configuration or an identifier of the selected text-to-speech service configuration.

14. The computer-implemented method of claim 11, further comprising:
dynamically identifying a language corresponding to the text communication client; and
configuring the speech-to-text service to provide the adapted natural language text in the identified language or select a different speech-to-text service configured to provide the adapted natural language text in the identified language.

15. The computer-implemented method of claim 14, wherein dynamically identifying the language corresponding to the text communication client further comprises:
obtaining, from the telephony system or the voice communication client, session information related to the audio stream using a session protocol, the session information comprising at least one of a caller identifier, a telephone number, or a geographic location, or a language identifier; and
determining the language corresponding to the voice communication client based on the session information.

16. The computer-implemented method of claim 11, wherein selecting the speech-to-text service configuration further comprises:
detecting the selection parameter associated with one or more of the speech-to-text services;
applying the selection parameter to selection criteria associated with the speech-to-text service configuration; and
selecting the speech-to-text service configuration in response to application of the selection parameter to the selection criteria.

17. The computer-implemented method of claim 16, wherein the selection parameter comprises at least one of a usage parameter, a performance parameter, a geographic location parameter, a participant identifier, or an option selection.

18. The computer-implemented method of claim 11, wherein the voice communications client comprises an interactive voice response system and the text communication client comprises a virtual agent, wherein the natural language text is communicated with the virtual agent wrapped in a JSON object.

19. The computer-implemented method of claim 11, wherein the natural language audio is based on a first audio encoding and the speech-to-text service is configured for a second audio encoding, wherein converting the natural language audio to the adapted natural language text further comprises:
converting the natural language audio from the first audio encoding to the second audio encoding; and
communicating the converted natural language audio to the speech-to-text service.

20. The computer-implemented method of claim 16, further comprising:
monitoring the selection parameter comprising a usage parameter or a performance parameter associated with the selected speech-to-text service;
determining that the monitored usage parameter or performance parameter is outside of predefined bounds; and
identifying a different speech-to-text service with a usage parameter or performance parameter within the predefined bounds; and
switching from the original speech-to-text service to the identified different speech-to-text service by communicating the natural language audio to the different speech-to-text service.

21. The computer-implemented method of claim 11, wherein coordinating, during the live bi-direction conversation, the communication between the telephony system, the voice communication client and the text communication client using a predetermined communication protocol further comprises: communicating instructions to transfer the live bi-directional conversation from the telephony system to a telephony microservice in communication with the voice communication client instead of the telephony system; and communicating, using the telephony microservice, the adapted natural language text to the text communication client and the adapted natural language audio to the voice communication client without using the telephony system.

* * * * *

UNITED STATES PATENT AND TRADEMARK OFFICE
CERTIFICATE OF CORRECTION

PATENT NO. : 11,404,057 B2  
APPLICATION NO. : 16/000138  
DATED : August 2, 2022  
INVENTOR(S) : Artur Liashenko et al.

Page 1 of 1

It is certified that error appears in the above-identified patent and that said Letters Patent is hereby corrected as shown below:

In the Specification

Column 4, Line 13, delete "langue"

Signed and Sealed this  
Thirteenth Day of September, 2022

Katherine Kelly Vidal  
*Director of the United States Patent and Trademark Office*